United States Patent
Shinzawa

(10) Patent No.: US 9,718,314 B2
(45) Date of Patent: Aug. 1, 2017

(54) PNEUMATIC TIRE

(75) Inventor: Tatsuro Shinzawa, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 1216 days.

(21) Appl. No.: 13/491,739

(22) Filed: Jun. 8, 2012

(65) Prior Publication Data

US 2012/0312438 A1  Dec. 13, 2012

(30) Foreign Application Priority Data

Jun. 8, 2011  (JP) .................................. 2011-128493

(51) Int. Cl.
*B60C 11/11* (2006.01)
*B60C 11/12* (2006.01)
*B60C 11/03* (2006.01)

(52) U.S. Cl.
CPC ....... *B60C 11/0302* (2013.01); *B60C 11/1218* (2013.04); *B60C 2011/0341* (2013.04); *B60C 2011/0348* (2013.04); *B60C 2011/0365* (2013.04); *B60C 2011/0372* (2013.04); *B60C 2011/0374* (2013.04)

(58) Field of Classification Search
CPC ............. B60C 11/0302; B60C 11/1218; B60C 2011/0372; B60C 2011/0374; B60C 2011/0348
See application file for complete search history.

(56) References Cited

U.S. PATENT DOCUMENTS

D669,417 S * 10/2012 Takei ........................... D12/564
9,027,612 B2   5/2015 Yamakawa
2002/0139462 A1* 10/2002 Hanebuth ........... B60C 11/0302
                                                            152/209.15

(Continued)

FOREIGN PATENT DOCUMENTS

CN   102083639    6/2011
JP   H02-045203   2/1990
JP   06-278412    10/1994

(Continued)

OTHER PUBLICATIONS

Machine translation for Japan 2002-059711 (no date).*
Machine translation for Japan 2000-142035 (no date).*
Japanese Office Action dated Apr. 17, 2013, 8 pages, Japan.

*Primary Examiner* — Steven D Maki
(74) *Attorney, Agent, or Firm* — Thorpe North & Western

(57) ABSTRACT

A center rib is formed by two circumferential main grooves. A main inclined groove and an auxiliary inclined groove are formed in the center rib. The main inclined groove is inclined with respect to the tire circumferential direction to become distanced from the tire equatorial plane from a leading side toward a trailing side in a tire rotational direction, a plurality of the main inclined grooves being juxtaposed in the tire circumferential direction and disposed alternately in the tire circumferential direction on both sides of the tire equatorial plane. The auxiliary inclined groove inclines with respect to the tire circumferential direction to become distanced from the tire equatorial plane from the leading side toward the trailing side in the tire rotational direction, a leading end and a trailing end terminating within the center rib while intersecting at least two of the main inclined grooves.

19 Claims, 3 Drawing Sheets

(56) References Cited

U.S. PATENT DOCUMENTS

2004/0112494 A1* 6/2004 Colombo ............ B60C 11/0302
  152/209.18
2008/0156405 A1* 7/2008 Tanabe .................... B60C 11/12
  152/209.18

FOREIGN PATENT DOCUMENTS

| JP | H06-305307 | 11/1994 |
| JP | H11-020412 | 1/1999 |
| JP | 2000-108615 | 4/2000 |
| JP | 2000-142035 A * | 5/2000 |
| JP | 2002-059711 A * | 2/2002 |
| JP | 2002-264611 | 9/2002 |
| JP | 2009-012678 | 1/2009 |
| JP | 2010-167931 | 8/2010 |
| JP | 2010-184570 | 8/2010 |
| RU | 92 386 | 3/2010 |
| WO | WO 2010/001742 | 1/2010 |

* cited by examiner

|  |  | Conventional Example | Working Example 1 | Working Example 2 | Working Example 3 | Working Example 4 | Working Example 5 | Working Example 6 | Working Example 7 | Working Example 8 | Working Example 9 | Working Example 10 |
|---|---|---|---|---|---|---|---|---|---|---|---|---|
| Main inclined groove | Presence/absence | Present | Present | Present | Present | Present | Present | Present | Present | Present | Present | Present |
|  | Central groove Groove width [mm] | Present | 7 | 6 | 2 | 3 | 3 | 3 | 3 | 3 | 3 | 3 |
|  | Central groove Groove depth [mm] | Present | 7 | 7 | 2 | 6 | 3 | 3 | 3 | 3 | 3 | 3 |
|  | θ1 [degree] | 60 | 80 | 80 | 80 | 80 | 80 | 66 | 66 | 66 | 66 | 66 |
|  | θ2 [degree] | - | 60 | 60 | 60 | 60 | 60 | 47 | 47 | 47 | 47 | 47 |
| Circumferential main grooves | Position [%] | 50 | 65 | 65 | 65 | 60 | 60 | 50 | 50 | 50 | 40 | 50 |
|  | Presence/absence | Absent | Present | Present | Present | Present | Present | Present | Present | Present | Present | Present |
| Auxiliary inclined groove | Leading end position [%] | - | 4 | 4 | 4 | 4 | 5 | 5 | 10 | 10 | 10 | 10 |
|  | Trailing end position [%] | - | 26 | 26 | 26 | 26 | 25 | 25 | 35 | 35 | 35 | 35 |
| Circumferential narrow groove (presence/absence) | | Absent | Absent | Absent | Absent | Absent | Absent | Absent | Absent | Present | Present | Present |
| Lug groove (presence/absence) | | Present | Absent | Absent | Absent | Absent | Absent | Absent | Absent | Absent | Present | Present |
| Sipe (center rib) | | 2D | 3D | 3D | 3D | 3D | 3D | 3D | 3D | 3D | 3D | 2D |
| Sipe (shoulder rib) | | 2D | 3D | 3D | 3D | 3D | 3D | 3D | 3D | 3D | 3D | 3D |
| Dry road surface steering stability | | 100 | 103 | 105 | 107 | 107 | 107 | 108 | 108 | 108 | 108 | 108 |
| Wet road surface steering stability | | 100 | 103 | 103 | 103 | 105 | 107 | 107 | 108 | 108 | 109 | 108 |
| Snow-covered road surface steering stability | | 100 | 106 | 106 | 106 | 108 | 110 | 112 | 113 | 115 | 117 | 119 |

FIG. 3

PNEUMATIC TIRE

PRIORITY CLAIM

Priority is claimed to Japan Patent Application Serial No. 2011-128493 filed on Jun. 8, 2011.

BACKGROUND

Technical Field

The present technology relates to a pneumatic tire that improves steering stability on snow-covered road surfaces without causing a deterioration in steering stability on dry and wet road surfaces.

Related Art

Conventionally, the object of a pneumatic tire (a tread of an automobile pneumatic tire) described in, for example, Japanese Unexamined Patent Application Publication No. H06-278412A is to reduce hydroplaning and improve winter performance. The pneumatic tire is equipped with a center block column extending in the tire circumferential direction and block columns arranged in a shoulder portion and separated from the center block column by two circumferential grooves. The pneumatic tire is devised to guide water from a center circumferential flat plane to both sides by providing grooved blocks of the center block column, the grooved blocks being made up of two groove portions that are separated from each other by an inclined groove and intersect in the center circumferential flat plane by forming an angle with the inclined groove. Moreover, this pneumatic tire is devised to discharge snow by providing circumferential grooves that extend at an acute angle with respect to the tire equatorial plane (tire circumferential flat plane).

The above-mentioned pneumatic tire disclosed in Japanese Unexamined Patent Application Publication No. H06-278412A is further equipped with grooves (groove extension portion and connecting groove) that connect with adjacent inclined grooves in the tire circumferential direction (tire rolling direction). The groove that connects with these inclined grooves becomes narrower to equalize the size of the blocks of the center block column. Although making the blocks narrower may be effective with respect to snow-covered road surfaces, there is a risk that steering stability on dry road surfaces may be reduced since the stiffness of the blocks is reduced. Additionally, there is a risk that water discharge performance is made worse and steering stability on wet road surfaces may be reduced since the grooves that connect with the inclined grooves are inclined in the direction opposite the inclined grooves and thus work against the action of the inclined grooves to guide water from the center circumferential flat plane to both sides and thus return the water to the center circumferential flat plane side.

SUMMARY

The present technology provides a pneumatic tire that can improve steering stability on snow-covered road surfaces without causing a deterioration in steering stability on dry and wet road surfaces. A pneumatic tire of the present technology includes, in a tread portion, a center rib formed by two circumferential main grooves extending along a tire circumferential direction in a center of a tire width direction including a tire equatorial plane. A main inclined groove and an auxiliary inclined groove are formed in the center rib. The main inclined groove is provided so as to incline with respect to the tire circumferential direction in a manner so as to become distanced from the tire equatorial plane from a leading side toward a trailing side in a tire rotational direction, a trailing end communicating with the circumferential main groove, a plurality of the main inclined grooves being juxtaposed in the tire circumferential direction and disposed alternately in the tire circumferential direction on both sides of the tire equatorial plane. The auxiliary inclined groove is provided so as to incline with respect to the tire circumferential direction in a manner so as to become distanced from the tire equatorial plane from the leading side toward the trailing side in the tire rotational direction, a leading end and a trailing end terminating within the center rib while intersecting at least two of the main inclined grooves, a plurality of the auxiliary inclined grooves being juxtaposed in the tire circumferential direction and disposed alternately in the tire circumferential direction on both sides of the tire equatorial plane.

According to this pneumatic tire, water discharge performance and snow discharge performance are improved so that steering stability on wet road surfaces is maintained and steering stability on snow-covered road surfaces can be effectively improved by providing, in the center ribs in the center of the tire width direction of the tread portion, inclined grooves that extend from the center of the tire width direction (near the tire equatorial plane) toward the outer side of the tire width direction. Moreover, since an auxiliary inclined groove is provided that intersects at least two main inclined grooves while a leading end and a trailing end terminate within a center rib, and since the both inclined grooves are disposed alternately in the tire circumferential direction, stiffness of the tread portion is maintained such that steering stability on dry road surfaces can be ensured. As a result, steering stability on snow-covered road surfaces can be improved without causing a deterioration in the steering stability on dry and wet road surfaces.

Additionally, with the pneumatic tire of the present technology, mutual leading end sides of the main inclined grooves disposed alternately in the tire circumferential direction extend beyond the tire equatorial plane and are in communication, and form a zigzag shaped central groove along the tire circumferential direction on the tire equatorial plane. A groove width of the central groove is formed so as to be in a range of not less than 2 [mm] and not greater than 6 [mm].

If the groove width of the central groove is 2 [mm] or greater, a noticeable improvement in the performance of water discharge performance and snow discharge performance can be achieved. On the other hand, if the groove width of the central groove is 6 [mm] or less, a noticeable effect in maintaining the stiffness of the tread portion can be achieved. As a result, according to the pneumatic tire, a noticeable improvement in steering stability on snow-covered road surfaces can be achieved without causing a deterioration in steering stability on dry and wet road surfaces.

Additionally, with the pneumatic tire of the present technology, a groove depth of the central groove is formed so as to be in a range of not less than 2 [mm] and not greater than 6 [mm].

If the groove depth of the central groove is 2 [mm] or greater, a noticeable effect in the improvement of water discharge performance and snow discharge performance can be achieved. On the other hand, if the groove depth of the central groove is 6 [mm] or less, a noticeable effect in maintaining the stiffness of the tread portion can be achieved. As a result, according to the pneumatic tire, a noticeable improvement in steering stability on snow-covered road surfaces can be achieved without causing a deterioration in steering stability on dry and wet road surfaces.

Additionally, with the pneumatic tire of the present technology, the circumferential main grooves are disposed between the tire equatorial plane and a ground contact edge so as to be in a range of not less than 40[%] and not greater than 60[%] from the tire equatorial plane.

Tire width direction components are ensured since a tire width direction dimension of the center rib is relatively wide due to the circumferential main groove being arranged at a position 40[%] or greater from the tire equatorial plane between the tire equatorial plane and a ground contact edge. As a result, a noticeable improvement in water discharge performance and snow discharge performance due to the inclined grooves can be achieved, and a noticeable effect in maintaining the stiffness of the center rib can be achieved. On the other hand, a reduction in water discharge performance and snow discharge performance due to the inclined grooves can be prevented since the tire width direction dimensions of the center ribs are prescribed due to the circumferential main grooves being disposed between the ground contact edge and the tire equatorial plane at a position not greater than 60[%] from the tire equatorial plane. Thus, according to the pneumatic tire, a noticeable improvement in steering stability on snow-covered road surfaces can be achieved without causing a deterioration in steering stability on dry and wet road surfaces.

Additionally, with the pneumatic tire of the present technology, the auxiliary inclined groove is disposed between the tire equatorial plane and the ground contact edge so that the leading end thereof is in a range of not less than 5[%] and not greater than 25[%] from the tire equatorial plane and the trailing end thereof is in a range of not less than 25[%] and not greater than 45[%] from the tire equatorial plane.

According to this pneumatic tire, a noticeable effect in maintaining the stiffness of the center rib can be achieved since the size of the blocks of the center rib partitioned by grooves is an appropriate size and there is no variation in the size of the blocks due to the provision of auxiliary inclined grooves according to the above-mentioned ranges. As a result, steering stability on dry road surfaces can be maintained.

Additionally, with the pneumatic tire of the present technology, a circumferential narrow groove extending along the tire circumferential direction is provided in a shoulder rib formed on an outer side in the tire width direction of the circumferential main groove. A groove width of the circumferential narrow groove is formed so as to be in a range of not less than 2 [mm] and not greater than 4 [mm], and a groove depth of the circumferential narrow groove is formed so as to be in a range of not less than 2 [mm] and not greater than 4 [mm].

According to the pneumatic tire, steering stability on snow-covered road surfaces is improved since edge components in the tire width direction are increased by providing the circumferential narrow groove in the shoulder rib. The above-mentioned range for the width and depth of the circumferential narrow groove is preferable since the stiffness may be reduced if the width and depth of the circumferential narrow groove are too large.

Additionally, with the pneumatic tire of the present technology, the main inclined groove is formed so that an angle that the trailing end side communicating with the circumferential main groove forms with the circumferential main groove is in a range of not less than 56 [degrees] and not greater than 76 [degrees].

According to the pneumatic tire, the discharge of water and snow from the main inclined grooves to the circumferential main grooves can be effectively performed by providing the main inclined grooves at the above-mentioned angle.

Additionally, with the pneumatic tire of the present technology, the main inclined groove is formed so that an angle that the leading end side intersecting the auxiliary inclined groove formed with the auxiliary inclined groove is in a range of not less than 37 [degrees] and not greater than 57 [degrees].

According to the pneumatic tire, the discharge of water and snow from the auxiliary inclined grooves to the main inclined grooves can be effectively performed by providing the main inclined grooves and the auxiliary inclined grooves at the above-mentioned angles.

Additionally, with the pneumatic tire of the present technology, a plurality of lug grooves juxtaposed in the tire circumferential direction is provided in the shoulder rib formed on the outer side in the tire width direction of the circumferential main groove. The lug grooves are provided along the tire width direction, and a first end thereof communicates with the circumferential main groove. The main inclined grooves are provided so as to communicate with the lug grooves, having the circumferential main grooves disposed between the main inclined grooves and the lug grooves.

According to the pneumatic tire, a noticeable effect in water and snow discharge can be effectively achieved by allowing the main inclined grooves to communicate with the lug grooves.

Additionally, with the pneumatic tire of the present technology, a two-dimensional sipe is provided in the center rib, and a three-dimensional sipe is provided in the shoulder rib formed on the outer side in the tire width direction of the circumferential main groove.

According to the pneumatic tire, the stiffness of the shoulder rib can be maintained by providing the three-dimensional sipe in the shoulder rib that bears a load when, for example, cornering. On the other hand, steering stability on snow-covered road surfaces can be improved since an appropriate pliability is given to the tread portion by providing two-dimensional sipes in the center ribs.

With the pneumatic tire according to the present technology, steering stability on snow-covered road surfaces can be improved without causing a deterioration in steering stability on dry and wet road surfaces.

BRIEF DESCRIPTION OF THE DRAWINGS

FIG. 3 is a table showing results of performance testing of pneumatic tires according to working examples of the present technology.

DETAILED DESCRIPTION

An embodiment of the present technology is described below in detail based on the drawings. However, the present technology is not limited to this embodiment. The constituents of the embodiment include constituents that can be easily replaced by those skilled in the art and constituents substantially same as the constituents of the embodiment. Furthermore, the multiple modified examples described in the embodiment can be combined as desired within the scope apparent to a person skilled in the art.

In the following description, "tire radial direction" refers to a direction orthogonal to the rotational axis (not illustrated) of a pneumatic tire 1; "inner side in the tire radial direction" refers to the side facing the rotational axis in the tire radial direction; and "outer side in the tire radial direction" refers to the side distanced from the rotational axis in the tire radial direction. Additionally, "tire width direction" refers to the direction parallel to the rotational axis; "inner side in the tire width direction" refers to the side facing a tire equatorial plane (tire equator line) CL in the tire width direction; and "outer side in the tire width direction" refers to the side distanced from the tire equatorial plane CL in the tire width direction. Furthermore, "tire circumferential direction" refers to a circumferential direction with the rotational axis as a center axis. "Tire equatorial plane CL" refers to a plane that is orthogonal to the rotational axis of the pneumatic tire 1 and that passes through a center of a tire width of the pneumatic tire 1. "Tire equator line" refers to a line along the circumferential direction of the pneumatic tire 1 that lies on the tire equatorial plane CL. In this embodiment, "tire equator line" is given the same reference symbol "CL" as that used for the tire equatorial plane.

Figure 1:
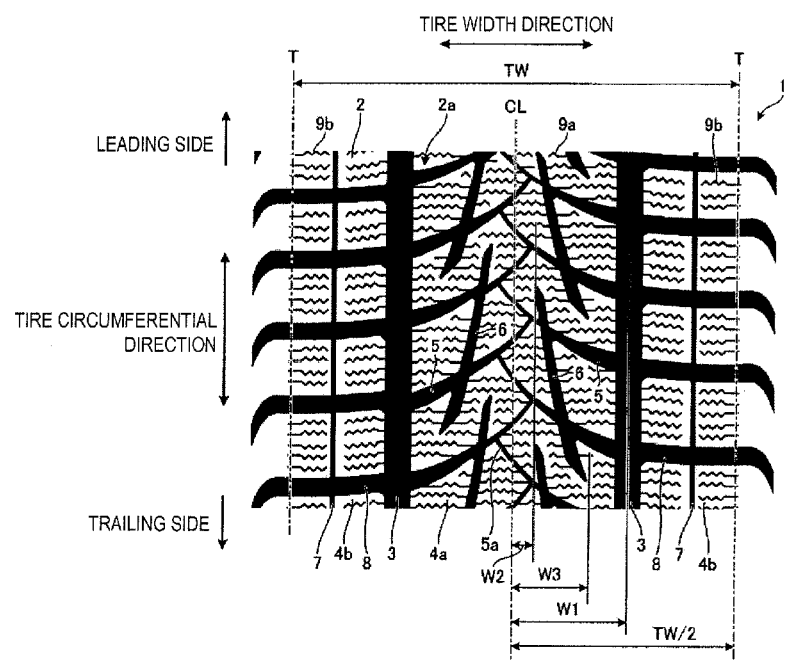
FIG. 1 is a plan view of a pneumatic tire according to an embodiment of the present technology.
Figure 2:
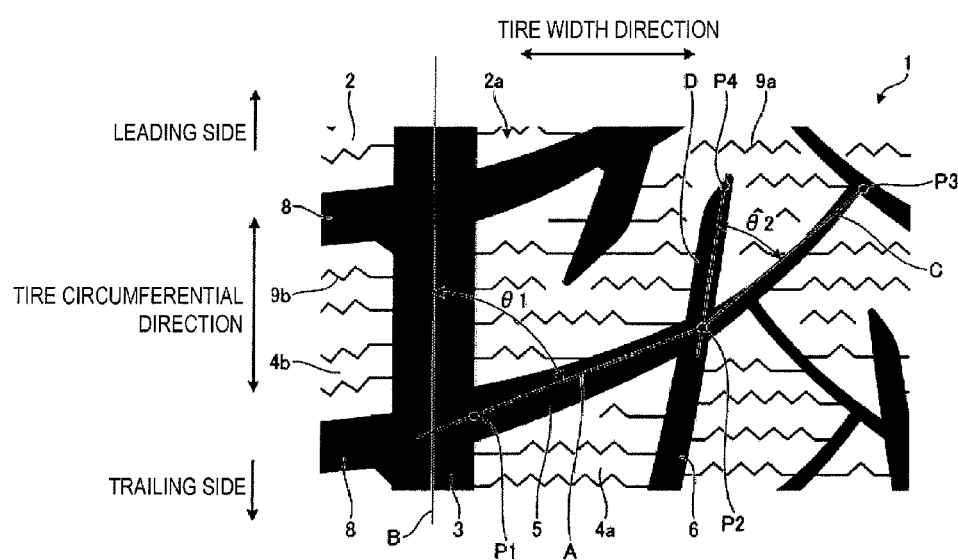
FIG. 2 is an enlarged plan view of the pneumatic tire illustrated in FIG. 1.

The pneumatic tire 1 of this embodiment is suitable as a winter tire. As illustrated in FIG. 1, the pneumatic tire 1 has a tread portion 2. The tread portion 2 is formed from a rubber material, is exposed on the outermost side in the tire radial direction of the pneumatic tire 1, and a surface 2a thereof constitutes a profile of the pneumatic tire 1. In the surface 2a of the tread portion 2, ground contact edges T are set at certain positions on both outer sides in the tire width direction and a distance between the ground contact edges T in the tire width direction is set as the ground contact width TW.

Here, the "ground contact width TW" refers to the maximum width in the tire width direction of a region (hereinafter, referred to as "ground contact region") in which the surface 2a of the tread portion 2 of the pneumatic tire 1 contacts the road surface when the pneumatic tire 1 is installed on a regular rim and filled with regular inner pressure and 70[%] of a regular load is applied. The "ground contact edge T" refers to both the outermost edges in the tire width direction of the ground contact region. The ground contact edge T continues in the tire circumferential direction as illustrated in FIG. 1.

Here, "Regular rim" refers to a "standard rim" defined by the Japan Automobile Tyre Manufacturers Association Inc. (JATMA), a "Design Rim" defined by the Tire and Rim Association, Inc. (TRA), or a "Measuring Rim" defined by the European Tyre and Rim Technical Organisation (ETRTO). "Regular inner pressure" refers to "maximum air pressure" stipulated by JATMA, a maximum value in "tire load limits at various cold inflation pressures" defined by TRA, and "inflation pressures" stipulated by ETRTO. Note that "regular load" refers to "maximum load capacity" stipulated by JATMA, a maximum value in "tire load limits at various cold inflation pressures" defined by TRA, and "load capacity" stipulated by ETRTO.

Two circumferential main grooves 3 that extend along the tire circumferential direction are juxtaposed in the tire width direction on the surface 2a of the tread portion 2. Ribs that are parallel to the tire equatorial plane CL and extend along the tire circumferential direction are formed on the surface 2a of the tread portion 2 by the two circumferential main grooves 3. The ribs are formed by center ribs 4a in the center of the tire width direction included in the tire equatorial plane, shoulder ribs 4b on the outer side in the tire width direction of the circumferential main grooves 3.

The circumferential main grooves 3 are each provided such that a distance W1 from the tire equatorial plane CL to the center of the groove width is $0.40 \leq W1/(TW/2) \leq 0.60$ in the space (TW/2) from the tire equatorial plane CL to the ground contact edge T. Specifically, the circumferential main grooves 3 are each disposed in the space (TW/2) from the tire equatorial plane CL to the ground contact edge T in a range of not less than 40[%] and not greater than 60[%] from the tire equatorial plane CL. The circumferential main grooves 3 are formed with a groove width in a range of not less than 2[%] and not greater than 10[%] of the ground contact width TW, and a groove depth in a range of not less than 6 [mm] and not greater than 10 [mm]. Although not illustrated in the drawings, groove walls of the circumferential main grooves 3 are formed in a relatively upright position at an angle close to a right angle at the center rib 4a side, and at an angle that is more sloped than the angle on the center rib 4a side at the shoulder rib 4b side.

A main inclined groove 5 and an auxiliary inclined groove 6 are formed in the center rib 4a. The main inclined groove 5 is provided by being inclined with respect to the tire circumferential direction such that the main inclined groove 5 becomes distanced from the tire equatorial plane CL from the leading side in the tire rotational direction toward the trailing side. The main inclined grooves 5 are provided such that the trailing ends thereof communicate with the circumferential main grooves 3. A plurality of main inclined grooves 5 is juxtaposed in the tire circumferential direction and alternately arranged in the tire circumferential direction on both sides of the tire equatorial plane CL. Furthermore, the main inclined grooves 5 are arranged such that mutual leading end sides thereof that are disposed alternately in the tire circumferential direction extend beyond the tire equatorial plane CL and are in communication, and form a zigzag shaped central groove 5a along the tire circumferential direction on the tire equatorial plane CL. The central groove 5a is formed with a groove width in a range of not less than 2 [mm] and not greater than 6 [mm]. The central groove 5a is formed with a groove depth in a range of not less than 2 [mm] and not greater than 6 [mm]. Furthermore, the main inclined grooves 5 outside of the central groove 5a is formed with a groove width in a range of not less than 2 [mm] and not greater than 10 [mm] and a groove depth in a range of not less than 2 [mm] and not greater than 10 [mm]. The main inclined grooves 5 are provided so as to be inclined in a curved shape as illustrated in FIG. 1, but may also be inclined in a linear shape.

The main inclined grooves 5 are formed at an angle $\theta 1$ in a range of not less than 56 [degrees] and not greater than 76 [degrees] with respect to the circumferential main grooves 3 (tire circumferential direction) at the trailing end side that communicates with the circumferential main grooves 3. The main inclined grooves 5 are formed at an angle $\theta 2$ in a range of not less than 37 [degrees] and not greater than 57 [degrees] with respect to the auxiliary inclined grooves 6 at the leading end sides that intersect the auxiliary inclined grooves 6 as described below. Here, the angle $\theta 1$ is the angle formed by a reference line A obtained by connecting a center point P1 of the groove width of the main inclined groove 5 at a portion in which the trailing end of the main inclined groove 5 communicates with the circumferential main groove 3 with a center point P2 of the portion that intersects the auxiliary inclined groove 6, and a center line (reference line in the tire circumferential direction) B of the circumferential main groove 3. Here, the angle $\theta 2$ is the angle formed by a reference line C obtained by connecting the above-mentioned center point P2 with a center point P3 of the groove width of the main inclined groove 5 at a portion in which the main inclined groove 5 communicates with another main inclined groove 5, and a reference line D that connects the above-mentioned center point P2 and a center point P4 of the groove width of the auxiliary inclined groove 6 at the leading end thereof. The center point P3 is the center of the groove width at the leading end of the main inclined groove 5 if the main inclined groove 5 does not communicate with another main inclined groove 5.

The auxiliary inclined grooves 6 are provided so as to be inclined with respect to the tire circumferential direction in a manner so as to become distanced from the tire equatorial plane CL from the leading side to the trailing side in the tire rotational direction. The auxiliary inclined grooves 6 are provided so that the leading ends and the trailing ends terminate within the center ribs 4a while intersecting at least two main inclined grooves 5. A plurality of auxiliary inclined grooves 6 is juxtaposed in the tire circumferential direction and disposed alternately in the tire circumferential direction on both sides of the tire equatorial plane CL. The auxiliary inclined grooves 6 are formed with a groove width in a range of not less than 2 [mm] and not greater than 15 [mm], and with a groove depth in a range of not less than 2 [mm] and not greater than 10 [mm]. The auxiliary inclined grooves 6 are provided so as to be inclined in a curved shape as illustrated in FIG. 1, but may also be inclined in a linear shape. The blocks of the center ribs 4a partitioned by grooves are formed by providing the inclined grooves 5 and 6 in this way.

The auxiliary inclined grooves 6 are provided such that a distance W2 from the tire equatorial plane CL to the leading end is 0.05≤W2/(TW/2)≤0.25 in the space (TW/2) from the tire equatorial plane CL to the ground contact edge T. Specifically, the auxiliary inclined grooves 6 are each disposed in the space (TW/2) from the tire equatorial plane CL to the ground contact edge T such that the leading end is in a range of not less than 5[%] and not greater than 25[%] from the tire equatorial plane CL. The auxiliary inclined grooves 6 are provided such that a distance W3 from the tire equatorial plane CL to the trailing end is 0.25≤W2/(TW/2) ≤0.45 in the space (TW/2) from the tire equatorial plane CL to the ground contact edge T. Specifically, the auxiliary inclined grooves 6 are each disposed in the space (TW/2) from the tire equatorial plane CL to the ground contact edge T such that the trailing end is in a range of not less than 25[%] and not greater than 45[%] from the tire equatorial plane CL.

The circumferential narrow grooves 7 and the lug grooves 8 are formed in the shoulder ribs 4b. The circumferential narrow grooves 7 are provided so as to extend along the tire circumferential direction. The circumferential narrow grooves 7 are formed with a groove width in a range of not less than 2 [mm] and not greater than 4 [mm], and a groove depth in a range of not less than 2 [mm] and not greater than 4 [mm].

The lug grooves 8 are provided along the tire width direction, a first end thereof communicating with the circumferential main grooves 3. A plurality of lug grooves 8 is juxtaposed in the tire circumferential direction. The main inclined grooves 5 are arranged such that the trailing ends thereof communicate with the lug grooves 8, having the circumferential main grooves 3 disposed between the main inclined grooves 5 and the lug grooves 8.

The center ribs 4a are also provided with the two-dimensional sipes 9a. The two-dimensional sipes 9a are curved or bent in the direction in which the sipes extend. The shoulder ribs 4b are also provided with the three-dimensional sipes 9b. The three-dimensional sipes 9b are curved or bent in the extending direction and depth direction of the sipes. The two-dimensional sipes 9a and the three-dimensional sipes 9b include a configurations in which both ends are terminated, a configuration in which one end is terminated and the other end communicates with a groove, and a configuration in which both ends communicate with grooves.

As described above, the pneumatic tire 1 of this embodiment includes, in the tread portion 2, the center rib 4a is formed by two circumferential main grooves 3 extending along the tire circumferential direction in the center of the tire width direction including the tire equatorial plane CL. The main inclined groove 5 and the auxiliary inclined groove 6 are formed in the center rib 4a, and the main inclined groove 5 is provided so as to incline with respect to the tire circumferential direction in a manner so as to become distanced from the tire equatorial plane CL from the leading side toward the trailing side in the tire rotational direction. The trailing end of the main inclined groove 5 communicates with the circumferential main groove 3, and the plurality of main inclined grooves 5 being juxtaposed in the tire circumferential direction and disposed alternately in the tire circumferential direction on both sides of the tire equatorial plane CL. The auxiliary inclined groove 6 is provided so as to incline with respect to the tire circumferential direction in a manner so as to become distanced from the tire equatorial plane CL from the leading side toward the trailing side in the tire rotational direction. The leading end and the trailing end terminate within the center rib 4a while intersecting at least two main inclined grooves 5, a plurality of auxiliary inclined grooves 6 being juxtaposed in the tire circumferential direction and disposed alternately in the tire circumferential direction on both sides of the tire equatorial plane CL.

According to this pneumatic tire 1, water discharge performance and snow discharge performance are improved so that steering stability on wet road surfaces is maintained and steering stability on snow-covered road surfaces is effectively improved by providing, in the center ribs 4a of the center of the tire width direction of the tread portion 2, the inclined grooves 5 and 6 that extend from the center of the tire width direction (near the tire equatorial plane CL) toward the outer side of the tire width direction. Moreover, since the auxiliary inclined groove 6 is provided that the leading end and the trailing end terminate within the center rib 4a while intersecting at least two main inclined grooves 5, and the inclined grooves 5 and 6 are disposed alternately in the tire circumferential direction, stiffness of the tread portion 2 is maintained such that steering stability on dry road surfaces can be ensured. As a result, steering stability on snow-covered road surfaces can be improved without causing a deterioration in steering stability on dry and wet road surfaces.

Additionally, with the pneumatic tire 1 of this embodiment, mutual leading end sides of the main inclined grooves 5 disposed alternately in the tire circumferential direction extend beyond the tire equatorial plane CL and are in communication, and form a zigzag shaped central groove 5a along the tire circumferential direction on the tire equatorial plane CL. The groove width of the central groove 5a is formed so as to be in a range of not less than 2 [mm] and not greater than 6 [mm].

If a groove width of a central groove 5a is 2 [mm] or greater, a noticeable improvement in water discharge performance and snow discharge performance can be obtained. On the other hand, if the groove width of the central groove 5a is 6 [mm] or less, a noticeable effect in maintaining the stiffness of the tread portion 2 can be achieved. As a result, according to the pneumatic tire 1, a noticeable improvement in steering stability on snow-covered road surfaces can be achieved without causing a deterioration in steering stability on dry and wet road surfaces.

Additionally, with the pneumatic tire 1 of this embodiment, the groove depth of the central groove 5a is formed so as to be in a range of not less than 2 [mm] and not greater than 6 [mm].

If the groove depth of the central groove 5a is 2 [mm] or greater, a noticeable effect in the improvement of water discharge performance and snow discharge performance can be achieved. On the other hand, if the groove depth of the central groove 5a is 6 [mm] or less, a noticeable effect in maintaining the stiffness of the tread portion 2 can be achieved. As a result, according to the pneumatic tire 1, a noticeable improvement in steering stability on snow-covered road surfaces can be achieved without causing a deterioration in steering stability on dry and wet road surfaces.

With the pneumatic tire 1 of this embodiment, the circumferential main grooves 3 are disposed in the space from the tire equatorial plane CL to the ground contact edge T in a range of not less than 40[%] and not greater than 60[%] from the tire equatorial plane CL.

By arranging the circumferential main grooves 3 at positions not less than 40[%] from the tire equatorial plane CL in the space from the tire equatorial plane CL to the ground contact edge T, the tire width direction dimensions of the center ribs 4a are relatively wider. As a result, tire width direction components can be ensured such that a noticeable improvement in water discharge performance and snow discharge performance is achieved due to the inclined grooves 5 and 6, and a noticeable effect in maintaining the stiffness of the center ribs 4a is achieved. On the other hand, a reduction in water discharge performance and snow discharge performance due to the inclined grooves 5 and 6 can be prevented since the tire width direction dimensions of the center ribs 4a are prescribed due to the circumferential main grooves 3 being disposed between the ground contact edge T and the tire equatorial plane CL at a position not more than 60[%] from the tire equatorial plane CL. As a result, according to the pneumatic tire 1, a noticeable improvement in steering stability on snow-covered road surfaces can be achieved without causing a deterioration in steering stability on dry and wet road surfaces. Circumferential main grooves 3 are more preferably arranged between a ground contact edge T and a tire equatorial plane CL at positions in a range of not less than 45[%] and not greater than 55[%] from the tire equatorial plane CL to achieve the above noticeable effect.

With the pneumatic tire 1 of this embodiment, auxiliary inclined grooves 6 are arranged in a space between the tire equatorial plane CL and the ground contact edge T such that the leading end thereof is in a range of not less than 5[%] and not greater than 25[%] from the tire equatorial plane CL, and the trailing end is in a range of not less than 25[%] and not greater than 45[%] from the tire equatorial plane CL.

According to the pneumatic tire 1, a noticeable effect in maintaining stiffness of center ribs 4a can be achieved since the size of the blocks of the center rib partitioned by grooves is an appropriate size and there is no variation in the size of the blocks due to the provision of auxiliary inclined grooves 6 according to the above-mentioned ranges. As a result, steering stability can be maintained on dry road surfaces. In addition, to maintain steering stability on dry road surfaces, the auxiliary inclined grooves 6 are more preferably arranged in the space between the tire equatorial plane CL and the ground contact edge T such that the leading end thereof is in a range of not less than 10[%] and not greater than 20 [%] from the tire equatorial plane CL, and the trailing end thereof is in a range of not less than 30[%] and not greater than 40[%] from the tire equatorial plane CL.

Additionally, with the pneumatic tire 1 of this embodiment, circumferential narrow grooves 7 extending along the tire circumferential direction are provided in shoulder ribs 4b formed on the outer side in the tire width direction of circumferential main grooves 3. The groove width of the circumferential narrow grooves 7 is formed so as to be in a range of not less than 2 [mm] and not greater than 4 [mm], and the groove depth of the circumferential narrow grooves 7 is formed so as to be in a range of not less than 2 [mm] and not greater than 4 [mm].

According to the pneumatic tire 1, steering stability on snow-covered road surfaces is improved since edge components in the tire width direction are increased by providing the circumferential narrow grooves 7 in the shoulder ribs 4b. The above-mentioned range for the groove width and groove depth of the circumferential narrow grooves 7 is preferable since the stiffness is reduced if the groove width and groove depth of the circumferential narrow grooves are too large.

Additionally, with the pneumatic tire 1 of this embodiment, main inclined grooves 5 are formed so that an angle that trailing end sides communicating with the circumferential main grooves 3 form with the circumferential main grooves 3 is in a range of not less than 56 [degrees] and not greater than 76 [degrees].

According to the pneumatic tire 1, the discharge of water and snow from the main inclined grooves 5 toward the circumferential main grooves 3 can be effectively performed by providing the main inclined grooves 5 at the above-mentioned angle. The discharge of water and snow can be more effectively performed by more preferably providing the main inclined grooves 5 such that the range of the above-mentioned angles is not less than 61 [degrees] and not greater than 71 [degrees].

Additionally, with the pneumatic tire 1 of this embodiment, the main inclined grooves 5 are formed so that the angle with respect to the auxiliary inclined groove 6 on the leading end side that intersects the auxiliary inclined groove 6 is in a range of not less than 37 [degrees] and not greater than 57 [degrees].

According to the pneumatic tire 1, the discharge of water and snow from the auxiliary inclined grooves 6 toward the main inclined grooves 5 can be effectively performed by providing the main inclined grooves 5 and the auxiliary inclined grooves 6 at the above-mentioned angles. To noticeably achieve even more effective performance of the discharge of water and snow, the above-mentioned angles are more preferably in a range of not less than 42 [degrees] and not greater than 52 [degrees].

Additionally, the pneumatic tire 1 of this embodiment includes a plurality of lug grooves 8 juxtaposed in the tire circumferential direction in the shoulder ribs 4b formed on the outer side in the tire width direction of the circumferential main grooves 3. The lug grooves 8 are provided along the tire width direction, the first ends thereof communicating with the circumferential main grooves 3. The main inclined grooves 5 are provided so as to communicate with the lug grooves 8, having the circumferential main grooves 3 disposed between the main inclined grooves 5 and the lug grooves 8.

According to the pneumatic tire 1, a noticeable effect in water and snow discharge can be effectively achieved by causing the main inclined grooves 5 to communicate with the lug grooves 8.

Additionally, with the pneumatic tire 1 of this embodiment, two-dimensional sipes 9a are provided in the center ribs 4a, and three-dimensional sipes 9b are provided in the shoulder ribs 4b formed on the outer side in the tire width direction of the circumferential main grooves 3.

The stiffness of the shoulder ribs 4b can be maintained by providing the three-dimensional sipes 9b in the shoulder ribs 4b that bear a load when, for example, cornering. On the other hand, steering stability on snow-covered road surfaces can be improved since an appropriate pliability is given to the tread portion 2 by providing the two-dimensional sipes 9a in the center ribs 4a.

Working Examples

In the working examples, performance testings for steering stability on dry, wet and snow-covered road surfaces were performed on a plurality of types of pneumatic tires under different conditions (see FIG. 3).

The performance testing for steering stability included assembling pneumatic tires having a tire size of 255/40 R19 on regular rims (a "standard rim" defined by the Japan Automobile Tyre Manufacturers Association Inc. (JATMA), a "Design Rim" defined by the Tire and Rim Association, Inc. (TRA), or a "Measuring Rim" defined by the European Tyre and Rim Technical Organisation (ETRTO)). The pneumatic tires were inflated to an air pressure of 250 [kPa] and mounted on a test vehicle (3.0 liter class four-wheel drive sedan).

In the evaluation method of steering stability on a dry road surface, a sensory evaluation of initial response by a driver when the test vehicle changed traveling lanes while traveling on a straight test course on a dry road surface at 200 [km/h] was used to evaluate steering stability using a conventional example as a standard score. Here, averages of evaluation scores by five drivers were calculated and shown as index scores against a conventional standard score of 100. In the evaluations, larger index scores indicate superior steering stability on the dry road surface and thus are preferable.

The evaluation method of the steering stability on wet road surfaces included driving the above test vehicle on a test course with a water depth of 10±1 [mm] and a turning radius of 100 R. The driving speeds of the test vehicles when the maximum lateral acceleration of the test tires occurred were recorded as hydroplaning generation speeds. Here, index scoring against a conventional standard score of 100 was conducted. In the evaluations, larger index scores indicate superior steering stability on the wet road surface and thus are preferable.

The evaluation method of the steering stability on snow-covered road surfaces included measuring the amount of time required for the test vehicle described above to corner around a circle having a radius of 30 [m] on a snow-covered road surface. Index scoring against a conventional standard score of 100 was conducted based on the measurement results. In the evaluations, larger index scores indicate superior steering stability on the snow-covered road surface and thus are preferable.

Although the conventional pneumatic tire has grooves similar to the main inclined grooves and corresponds to the pneumatic tire disclosed in Japanese Unexamined Patent Application Publication No. H06-278412A, the conventional pneumatic tire does not have a structure corresponding to the auxiliary inclined grooves nor the circumferential narrow grooves, and the sipes of the conventional pneumatic tire are two-dimensional sipes.

Meanwhile, the pneumatic tires according to the working examples 1 to 10 include the main inclined grooves and the auxiliary inclined grooves. The pneumatic tire according to the working example 2 includes a central groove with a prescribed groove width. The pneumatic tires according to the working examples 3 to 10 include a central groove with a prescribed groove width and groove depth. The pneumatic tires according to the working examples 5 to 10 include a prescribed arrangement of the leading end and the trailing end of the auxiliary inclined grooves. The pneumatic tires according to the working examples 6 to 10 include the prescribed angles θ1 and θ2 of the main inclined grooves. The pneumatic tires according to the working examples 7 to 10 include another prescribed arrangement of the leading end and the trailing end of the auxiliary inclined grooves. The pneumatic tires according to the working examples 8 to 10 include the circumferential narrow groove. In the pneumatic tires according to the working examples 9 and 10, the lug grooves communicate with the main inclined grooves. In the working example 10, the sipes of the center ribs are two-dimensional (2D) sipes, and the sipes of the shoulder ribs are three-dimensional (3D) sipes.

As shown in the test results of FIG. 3, with the pneumatic tires according to the working examples 1 to 11, it can be seen that the steering stability on snow-covered road surfaces is improved while the steering stability on both dry road surfaces and wet road surfaces is maintained.

What is claimed is:

1. A pneumatic tire, comprising, in a tread portion, a center rib formed by two circumferential main grooves extending along a tire circumferential direction in a center of a tire width direction including a tire equatorial plane; wherein a main inclined groove and an auxiliary inclined groove are formed in the center rib, the main inclined groove being provided so as to incline with respect to the tire circumferential direction in a manner so as to become distanced from the tire equatorial plane from a leading side toward a trailing side in a tire rotational direction, a trailing end communicating with the circumferential main groove, a plurality of the main inclined grooves being juxtaposed in the tire circumferential direction and disposed alternately in the tire circumferential direction on both sides of the tire equatorial plane; the auxiliary inclined groove being provided so as to incline with respect to the tire circumferential direction in a manner so as to become distanced from the tire equatorial plane from the leading side toward the trailing side in the tire rotational direction, a leading end and a trailing end terminating within the center rib while intersecting at least two of the main inclined grooves, a plurality of the auxiliary inclined grooves being juxtaposed in the tire circumferential direction and disposed alternately in the tire circumferential direction on both sides of the tire equatorial plane, mutual leading end sides of the main inclined grooves disposed alternately in the tire circumferential direction extend beyond the tire equatorial plane and are in communication, and form a zigzag shaped central groove along the tire circumferential direction on the tire equatorial plane where a distance in the tire width direction from the tire equatorial plane to the central groove varies gradually and continuously; a groove width of the central groove being formed so as to be in a range of not less than 2 mm and not greater than 6 mm, and the main inclined groove has a curved shape being curved such that an angle of the inclined main groove with respect to the circumferential direction gradually and continuously increases from the leading end of the main inclined groove to the trailing end of the main inclined groove.

2. The pneumatic tire according to claim 1, wherein a groove depth of the central groove is formed so as to be in a range of not less than 2 mm and not greater than 6 mm.

3. The pneumatic tire according to claim 2, wherein the circumferential main grooves are disposed between the tire equatorial plane and a ground contact edge so as to be in a range of not less than 40% and not greater than 60% from the tire equatorial plane.

4. The pneumatic tire according to claim 3, wherein the auxiliary inclined groove is disposed between the tire equatorial plane and the ground contact edge so that the leading end thereof is in a range of not less than 5% and not greater than 25% from the tire equatorial plane and the trailing end thereof is in a range of not less than 25% and not greater than 45% from the tire equatorial plane.

5. The pneumatic tire according to claim 4, wherein a circumferential narrow groove extending along the tire circumferential direction is provided in a shoulder rib formed on an outer side in the tire width direction of the circumferential main groove, a groove width of the circumferential narrow groove being formed so as to be in a range of not less than 2 mm and not greater than 4 mm, and a groove depth of the circumferential narrow groove being formed so as to be in a range of not less than 2 mm and not greater than 4 mm.

6. The pneumatic tire according to claim 5, wherein the main inclined groove is formed so that an angle that the trailing end communicating with the circumferential main groove forms with the circumferential main groove is in a range of not less than 56 degrees and not greater than 76 degrees.

7. The pneumatic tire according to claim 6, wherein the main inclined groove is formed so that an angle that the leading end side intersecting the auxiliary inclined groove forms with the auxiliary inclined groove is in a range of not less than 37 degrees and not greater than 57 degrees.

8. The pneumatic tire according to claim 7, wherein a plurality of lug grooves juxtaposed in the tire circumferential direction is provided in the shoulder rib formed on the outer side in the tire width direction of the circumferential main groove, the lug grooves being provided along the tire width direction, a first end thereof communicating with the circumferential main groove; and the main inclined grooves are provided so as to communicate with the lug grooves, having the circumferential main grooves disposed between the main inclined grooves and the lug grooves.

9. The pneumatic tire according to claim 8, wherein a two-dimensional sipe is provided in the center rib, and a three-dimensional sipe is provided in the shoulder rib formed on the outer side in the tire width direction of the circumferential main groove.

10. The pneumatic tire according to claim 1, wherein the circumferential main grooves are disposed between the tire equatorial plane and a ground contact edge so as to be in a range of not less than 40% and not greater than 60% from the tire equatorial plane.

11. The pneumatic tire according to claim 1, wherein the auxiliary inclined groove is disposed between the tire equatorial plane and a ground contact edge so that the leading end thereof is in a range of not less than 5% and not greater than 25% from the tire equatorial plane and the trailing end thereof is in a range of not less than 25% and not greater than 45% from the tire equatorial plane.

12. The pneumatic tire according to claim 1, wherein a circumferential narrow groove extending along the tire circumferential direction is provided in a shoulder rib formed on an outer side in the tire width direction of the circumferential main groove, a groove width of the circumferential narrow groove being formed so as to be in a range of not less than 2 mm and not greater than 4 mm, and a groove depth of the circumferential narrow groove being formed so as to be in a range of not less than 2 mm and not greater than 4 mm.

13. The pneumatic tire according to claim 1, wherein the main inclined groove is formed so that an angle that the trailing end communicating with the circumferential main groove forms with the circumferential main groove is in a range of not less than 56 degrees and not greater than 76 degrees.

14. The pneumatic tire according to claim 1, wherein the main inclined groove is formed so that an angle that the leading end side intersecting the auxiliary inclined groove forms with the auxiliary inclined groove is in a range of not less than 37 degrees and not greater than 57 degrees.

15. The pneumatic tire according to claim 1, wherein a plurality of lug grooves juxtaposed in the tire circumferential direction is provided in a shoulder rib formed on an outer side in the tire width direction of the circumferential main groove, the lug grooves being provided along the tire width direction, a first end thereof communicating with the circumferential main groove; and the main inclined grooves are provided so as to communicate with the lug grooves, having the circumferential main grooves disposed between the main inclined grooves and the lug grooves.

16. The pneumatic tire according to claim 1, wherein a two-dimensional sipe is provided in the center rib, and a three-dimensional sipe is provided in a shoulder rib formed on an outer side in the tire width direction of the circumferential main groove.

17. The pneumatic tire according to claim 1, wherein the circumferential main grooves are arranged between a ground contact edge and a tire equatorial plane at positions in a range of not less than 45% and not greater than 55% from the tire equatorial plane.

18. The pneumatic tire according to claim 1, wherein the auxiliary inclined grooves are arranged in a space between the tire equatorial plane and a ground contact edge such that the leading end thereof is in a range of not less than 10% and not greater than 20% from the tire equatorial plane.

19. The pneumatic tire according to claim 18, the auxiliary inclined grooves are arranged in the space between the tire equatorial plane and the ground contact edge such that the trailing end thereof is in a range of not less than 30% and not greater than 40% from the tire equatorial plane.

* * * * *